United States Patent [19]

Bratoljic

[11] 4,200,817
[45] Apr. 29, 1980

[54] Δ-CONNECTED, TWO-LAYER, THREE-PHASE WINDING FOR AN ELECTRICAL MACHINE

[75] Inventor: Tihomir Bratoljic, Wettengen, Switzerland

[73] Assignee: BBC Brown Boveri & Company Limited, Baden, Switzerland

[21] Appl. No.: 866,960

[22] Filed: Jan. 5, 1978

[30] Foreign Application Priority Data

Jan. 20, 1977 [CH] Switzerland .......................... 699/77

[51] Int. Cl.² .............................................. H02K 3/00
[52] U.S. Cl. .................................. 310/198; 310/201; 310/52
[58] Field of Search ............... 310/179, 198, 180, 184, 310/200–208, 10, 40, 52; 318/495, 496; 322/90

[56] References Cited
U.S. PATENT DOCUMENTS

| | | | |
|---|---|---|---|
| 2,745,029 | 5/1956 | McElligott | 310/202 |
| 3,195,223 | 6/1965 | Soviero | 310/198 |
| 3,201,627 | 8/1965 | Harrington | 310/206 |
| 3,430,126 | 2/1969 | Richardson | 310/198 |
| 3,476,964 | 11/1969 | Willyoung | 310/198 |
| 3,739,213 | 6/1973 | Willyoung | 310/198 |
| 3,743,875 | 7/1973 | Smith | 310/201 |
| 3,753,013 | 8/1973 | Beermann | 310/198 |
| 4,028,572 | 6/1977 | Baltisberger | 310/201 |

*Primary Examiner*—R. Skudy
*Attorney, Agent, or Firm*—Burns, Doane, Swecker & Mathis

[57] ABSTRACT

A winding for a Δ-connected, two-layer, three phase electrical machine with at least two shunt connected sets of coils per phase wherein the winding is arranged such that two adjacent sets of coils are connected with the coils of one set being cross connected and the other set being uncrossed. The coil end overhangs of the crossed set are longer than the overhangs of the uncrossed set. The voltage difference between adjacent conductor rods of one layer thus amounts, at all phase changes, at most to one winding voltage.

7 Claims, 12 Drawing Figures

Δ-CONNECTED, TWO-LAYER, THREE-PHASE WINDING FOR AN ELECTRICAL MACHINE

BACKGROUND OF THE INVENTION

The invention relates to windings for electrical machines such as motors and generators and, more particularly, to a Δ-connected, two-layer, three-phase winding for electrical machines, especially superconducting machines, with at least two shunt connected sets of coils per phase.

In the design of electrical machines, the rated voltage of the machine and the total volume of the insulation have a great influence on the economy of the machine. It is typically the aim to attain a maximum value for rated voltage of the machine while keeping the volume of the insulation at a minimum value.

In one standard design two-layer, three-phase winding used in large electro-unit engineering and referred to hereinafter as a conventional winding, the conductor rods are arranged in slots of the stator plate in two radially superposed layers. The three phase windings are either γ-connected or Δ-connected (delta-connected) and the sets of coils, of which there are at least two for each phase, are connected either in parallel (shunt) or in series.

With windings of this type a relatively high voltage will occur at the so-called phase change, between the conductor rods and the plate iron, between conductor rods belonging to the same or a different phase, either superposed or located side-by-side, and between adjacent conductors of one layer of the coil end. For example, in case of a Δ-connection with two sets of shunt connected coils per phase, the voltage at the phase changes, e.g. the voltage between adjacent winding elements carrying different phases of the three-phase input voltage, will be the full phase-to-phase voltage. The statements made above are substantially also true in case of air-gap windings where the conductor rods are placed within an insulating cylinder. Therefore the conductors need to be insulated against the high voltages involved, a fact which is especially disadvantageous in case of conventional machines of ultra-large size as well as superconducting machines because their spatial and insulation requirements will go beyond their permissible limits due to the high voltages arising therein.

In another known winding arrangement, described in U.S. Pat. No. 3,743,875, which is particularly suitable for superconducting machines but can also be used in connection with conventional machines, the insulation volume is reduced by specific arrangements involving construction as well as electrical connections. The stator of this electrical machine contains a central active component of smaller external diameter in which the conductor rods extend in the axial direction, forming two superposed layers. Each end of the active component carries one section of greater external diameter, and the end sections of the conductor rods are spread forming four radially superposed layers. The end sections of the conductor rods of each layer are bent helically by 90 electrical degrees with the bends of superposed layers oriented in such manner that they will cross each other to allow the necessary series connections.

The end sections of the conductor rods located side-by-side are insulated from each other against a voltage amounting to four winding voltages wherein a winding voltage is the voltage across a single conductor rod of a winding (i.e. from one end turn of a conductor rod to the opposite end turn). Furthermore, there are arranged within the two end sections of the stator, between all four superposed layers, insulating cylinders which must be able to withstand a substantially greater voltage because there occurs a phase-meshed voltage across the intersecting conductors. In general, this arrangement is complicated, is costly and requires a great amount of material.

Published German application 2 518 786 shows a six-phase winding which consists of two three-phase sub-windings, displaced by 30 electrical degrees relative to each other, their phase zones each taking up 30° circumferentially. The two sub-windings consisting of standard coils without cross-connections are wound in opposite directions and are installed in the stator with terminals located at diverse sides. This arrangements limits the voltage at the phase changes to 52% of the phase voltage of the equivalent three-phase winding, produced by a series connection of the two sub-windings. This solution has the great disadvantage that it requires winding connections at both sides of the stator, with six leads on each side, as well as an additional transformer winding.

U.S. Pat. No. 2,745,029 shows another solution for the purpose of reducing the potential to ground and at the phase change of a three-phase winding. The centers of at least one parallel branch in each of the three phases are tapped, connected to each other and grounded. The parallel branches, built up from standard coils without cross-connections are wound in opposite directions and are installed in the stator with terminals located at diverse sides. The voltage at the phase changes amounts in this case to 27% of the phase voltage. However, the number of winding leads—nine at one side, and six at the other side of the stator—exceeds even the number of leads needed by the above-described arrangement of the German application. These two solutions, in fact, have one disadvantage in common, namely the need for three additional high-voltage lead-throughs at the generator transformer.

It is a primary object of this invention to provide a three-phase winding of the above-described type where the load voltage of the conductor rods within one layer in the active portion as well as in the coil end of an electrical machine is reduced by means of inexpensive layouts in design, so that a high machine voltage will be possible while the insulation volume is held to a low value, in order to save space as well as cost.

A three-phase winding to solve this problem is characterized by the features that in the case of two adjacent sets of coils the coils of one set are cross-connected and the coils of the other set are non-crossed, whereby the coil end overhangs of the crossed sets are longer than the overhangs of the non-crossed sets, and where the difference in voltage between adjacent conductor rods of one layer amounts at all phase shifts at the most to one winding voltage during operations.

This feature is accomplished because the adjacent conductors are not removed from their common terminal at the most by one turn each at the phase change and because, due to the phase displacement of 60° within the two volt turns, their difference, that is the voltage across the adjacent conductor rods involved, will likewise amount to one turn voltage only.

The three-phase winding proposed by the invention, can be a two-pole or a multi-pole, a chorded or an unchorded winding. It makes possible a saving of space as well as of insulation, and is particularly suitable for use in connection with conventional ultra-large machines and superconducting machines.

The foregoing and other objects and advantages of the present invention will become apparent to one skilled in the art to which the invention pertains from the following detailed description when read in conjunction with the appended drawings.

DETAILED DESCRIPTION

Figure 1:
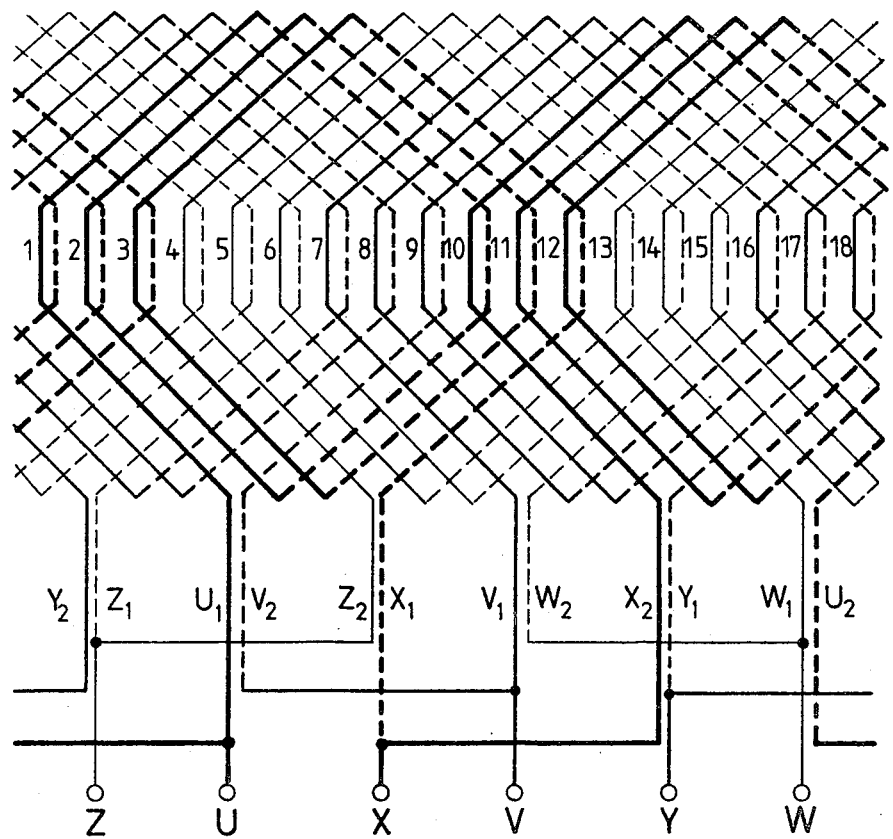
FIG. 1 shows a Δ-connected two-layer unchorded three-phase winding representing the present state of art with two shunt connected coil sets per phase.

Identical parts or elements are denoted by identical reference numerals in the various Figures described hereinafter.

Figure 2:
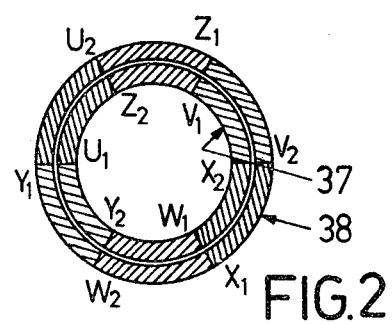
FIG. 2 illustrates the spatial arrangement of the coil sets of the winding shown in FIG. 1 in the form of a cross-section through the active components, taken perpendicular to the machine axis.
Figure 3:
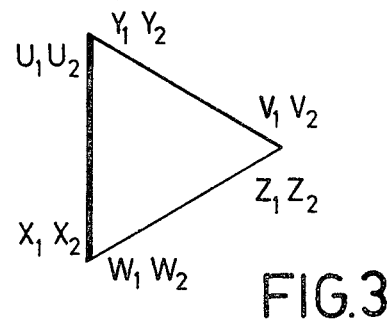
FIG. 3 depicts a volt-gauge graph, valid for all three-phase windings shown by FIGS. 1, 2 and 4 to 9.

FIGS. 1 and 2 depict an unchorded two-pole multiple winding, representing the present state of art. The illustrated winding contains a total of 36 conductor rods which are arranged in the slots 1 to 18 of a stator in two radially superposed layers 37, 38. The conductor rods of the upper layer 37 are shown in FIG. 1 by means of solid lines, and the conductor rods of the lower layer 38 by broken lines. The windings can be connected to a source of three-phase power by means of three pairs of terminals UX, VY and WZ. The three phases respectively represented by the three terminal pairs UX, VY and WZ have two sets of coils each: phase UX comprises coil sets $U_1X_1$ and $U_2X_2$, phase VY the coil sets $V_1Y_1$ and $V_2Y_2$ and phase WZ coil sets $W_1Z_1$ and $W_2Z_2$ (see FIG. 3). FIG. 2 depicts the conductor rods of the lower layer 38 which are associated with the several phases at the same angular positions as held by the conductor rods of the upper layer 37 because the winding shown there is unchorded. The distribution of the rods within the coil end (not shown in cross-section) is the same as their distribution in the active component, progressively increasing from the end of the active component, but turned at an angle that runs in relatively reverse directions within the two layers.

The coil sets $U_1X_1$, $U_2X_2$, $V_1Y_1$, $V_2Y_2$, $W_1Z_1$ and $W_2Z_2$ are not cross-connected, in other words, all sets are progressing in the same direction, toward the right. In the case illustrated, the difference in pitch of windings (viewing slot positions of each conductor rod of a winding) may be expressed as $y_1-y_2=1$, with $y_1=9$ representing the pitch at the non-junction side, and $y_2=8$ the pitch at the junction side. The coil set $U_1X_1$ is connected in shunt with the coil set $U_2X_2$, the coil set $V_1Y_1$ with the coil set $V_2Y_2$ and the coil set $W_1Z_1$ with the coil set $W_2X_2$. One winding voltage only will appear across adjacent rods of the same coil set, for example across rods 1 and 2. However, the full phase voltage will appear at the phase changes, for example across the rods 3 and 4 which are placed side-by-side but which carry voltage components of different phases. This fact is demonstrated by the volt-gauge graph shown in FIG. 3 where $X_1$ and $Z_2$ are located at different points of the delta. Full phase voltage will also arise across the outer conductors of coil sets belonging to one phase and superposed within the active component because these conductors end at the unlike terminals of the respective phase (see FIGS. 1 and 2).

Figure 4:
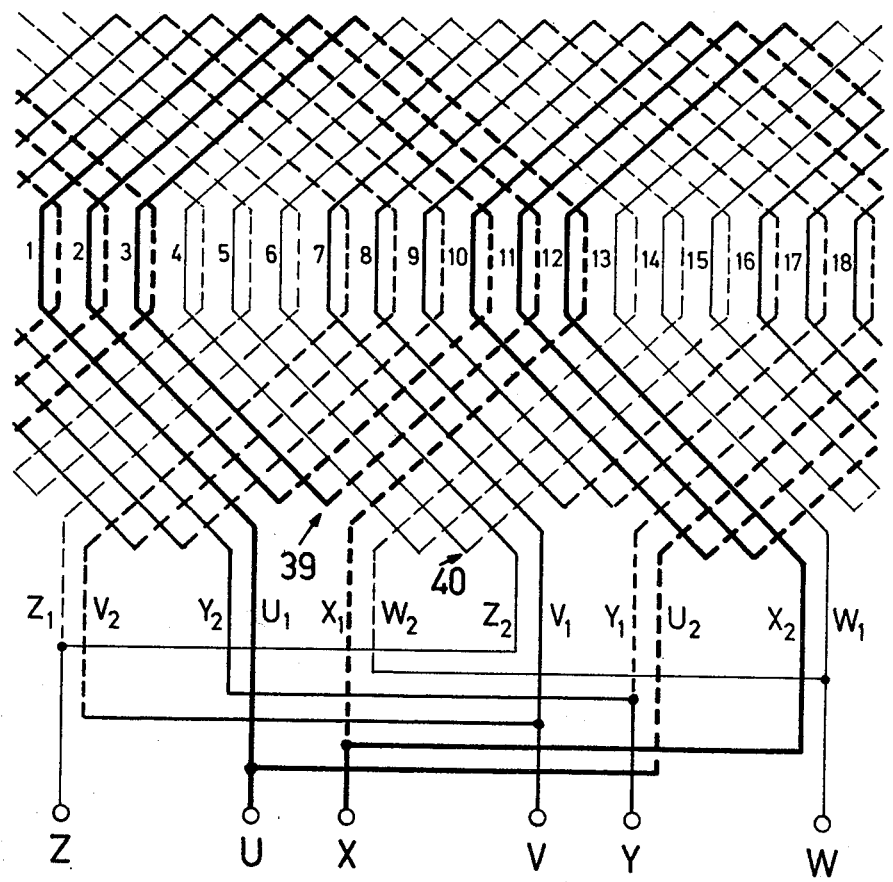
FIG. 4 shows an unchorded three-phase winding in accordance with the invention.
Figure 5:
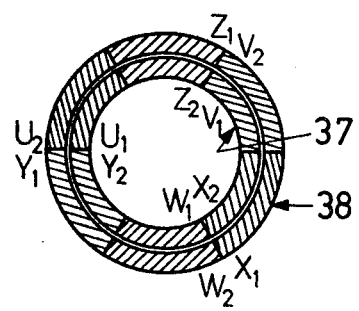
FIG. 5 illustrates the spatial arrangement of the coil sets of winding shown in FIG. 4 in the form of a cross-section through the active component, taken perpendicular to the machine axis.

FIGS. 4 and 5 illustrate an unchorded winding in accordance with the invention, again comprising a two-pole multiple winding with 36 conductor rods which are arranged in the slots 1 to 18 of a stator in two radially superposed layers 37, 38. The arrangement differs from the winding illustrated in FIGS. 1 and 2; while the coil sets $U_1X_1$, $V_1Y_1$ and $W_1Z_1$ are not cross-connected, that is, they are progressing in one direction, namely to the right, the coil sets $U_2X_2$, $V_2Y_2$ and $W_2Z_2$ do progress to the left and are thus crossed. The uncrossed coil sets with the pitches $y_1=9$ and $y_2=8$ satisfy the condition $y_1-y_2=1$, and the crossed coil sets with the pitches $y_1=9$ and $y_2-10$ the condition $y_1-y_2=-1$. Furthermore, the uncrossed coil sets have coil end overhangs 39 which are shorter than the coil end overhangs 40 of the crossed coil sets.

Here again, one winding voltage appears across adjacent rods of the same phase, for example across the rods 1 and 2, both being components of the phase UX. At the phase shifts or changes, however, adjacent rods will substantially be at the same potential if the two coil sets of each phase are shunt-connected as shown in the drawing, for example the rods 3 and 4, where the rod 3 is a component of phase UX and the rod 4 is a component of phase WZ. This fact is demonstrated by the volt-gauge graph of FIG. 3 where $X_1$ and $W_2$ are located at the same point of the delta. A close examination will show that the voltage difference between the rods 3 and 4 is exactly equal to one winding voltage because the first rod is removed from the terminal $X_1$ by the length of one turn, and the second rod is removed by one turn from the terminal $W_2$ (which is connected with $X_1$) and because the voltages induced in these windings have a phase displacement of 60° relative to each other so that the voltage difference will also become equal to the value of the winding voltage.

The unchorded winding proposed by the invention has the additional feature that there will not exist any voltage difference between the rods superposed within the active component because the distribution of the conductor rods, including the leads from the outer conductors of the several coil sets to the like phase terminals, is identical in both layers as is clearly illustrated in FIG. 5.

Figure 6:
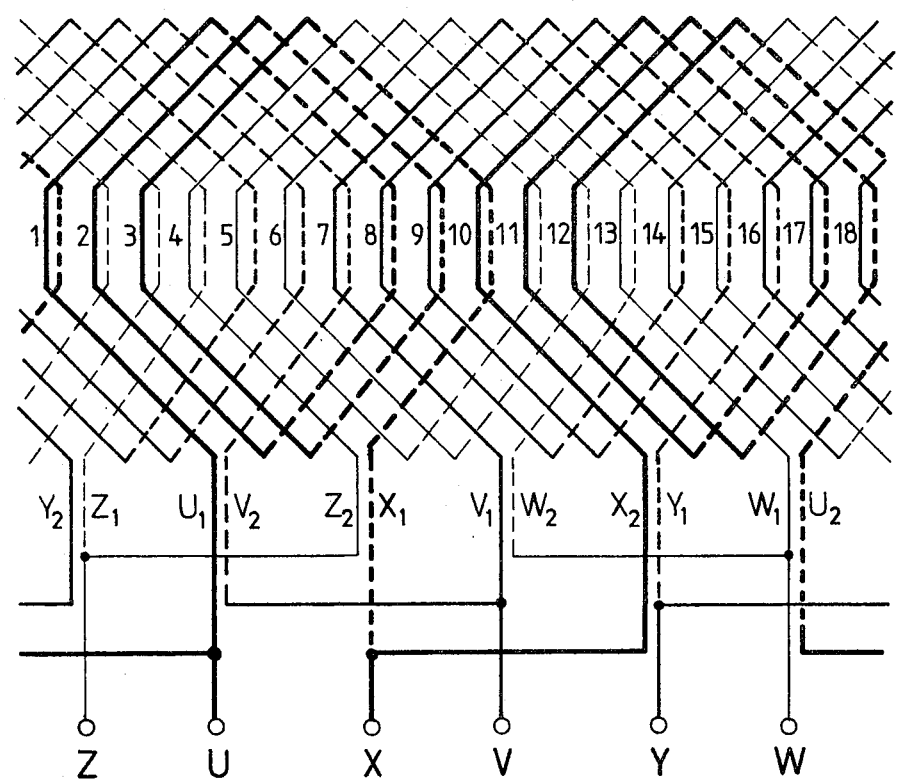
FIG. 6 shows a Δ-connected two-layer chorded three-phase winding representing the present state of art with two shunt connected coil sets per phase.
Figure 7:
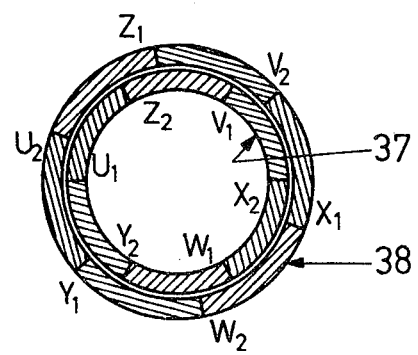
FIG. 7 illustrates the spatial arrangement of the coil sets of the winding shown in FIG. 6 in the form of a cross-section through the active component, taken perpendicular to the machine axis.

FIGS. 6 and 7 depict a chorded winding in accordance with the present state of art. Again, there is shown a two-pole multiple winding with 36 conductor rods which are arranged in the slots 1 to 18 of a stator in two radially superposed layers 37, 38. While conforming with a chording ratio of 7/9, the distribution of the conductor rods at the lower layer 38 is identical with the distribution at the upper level 37 with respect to phase assignment, but turned by an angle of 40° inside the active component. All coil sets are uncrossed, which means that they are progressing in the same direction toward the right, satisfying the correlation $y_1 - y_2 = 1$, and where $y_1 = 7$ and $y_2 = 6$. Across adjacent rods of the same coil set, for example across rods 1 and 2, only one winding voltage will appear while the full phase voltage will arise at the phase changes, for example across rods 3 and 4, located side-by-side. This fact is demonstrated by FIG. 3 where $X_1$ and $Z_2$ are located at different points of the delta.

Figure 8:
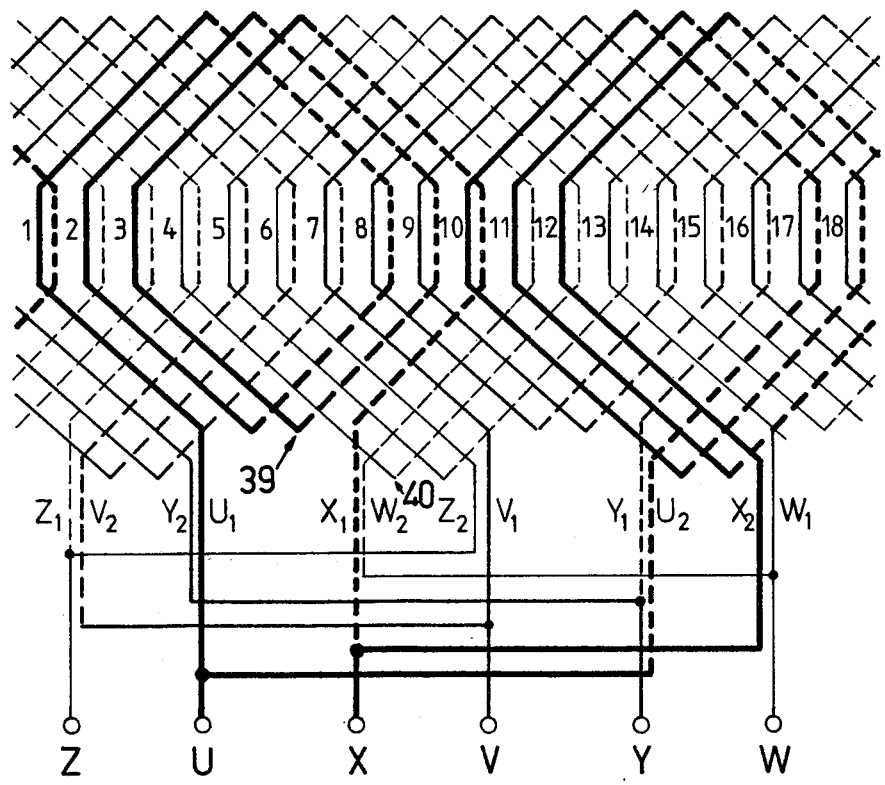
FIG. 8 shows a chorded three-phase winding in accordance with the invention.
Figure 9:
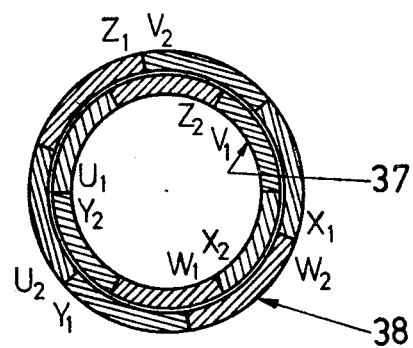
FIG. 9 illustrates the spatial arrangement of the coil sets of the winding shown in FIG. 8 in the form of a cross-section through the active component, taken perpendicular to the machine axis.

FIGS. 8 and 9 show a chorded winding in accordance with the invention where the chording ratio is again 7/9. This winding differs from the known chorded winding depicted by FIGS. 6 and 7 because only the coil sets $U_1X_1, V_1Y_1$ and $W_1Z_1$ are uncrossed, their pitches $y_1 = 6$ satisfying the condition $y_1 - y_2 = 1$, while the coil sets $U_2X_2, V_2Y_2$ and $W_2Z_2$ are crossed, their pitches $y_1 = 7$ and $y_2 = 8$ thus satisfying the condition $y_1 - y_2 = -1$. Furthermore, the uncrossed coil sets again have coil end overhangs 39 which are shorter than the coil end overhangs 40 of the crossed coil sets.

Only one winding voltage appears across adjacent rods of a like phase, for example across the rods 1 and 2 which are both components of the phase UX. At the phase changes however, adjacent rods will substantially be at the same potential if the two coil sets of each phase are connected in shunt as shown in the drawing, for example the rods 3 and 4 which are components of different phases. This fact is demonstrated by the volt-gauge graph of FIG. 3, where $X_1$ and $W_2$ are located at the same point of the delta.

Figures 10, 11, 12:
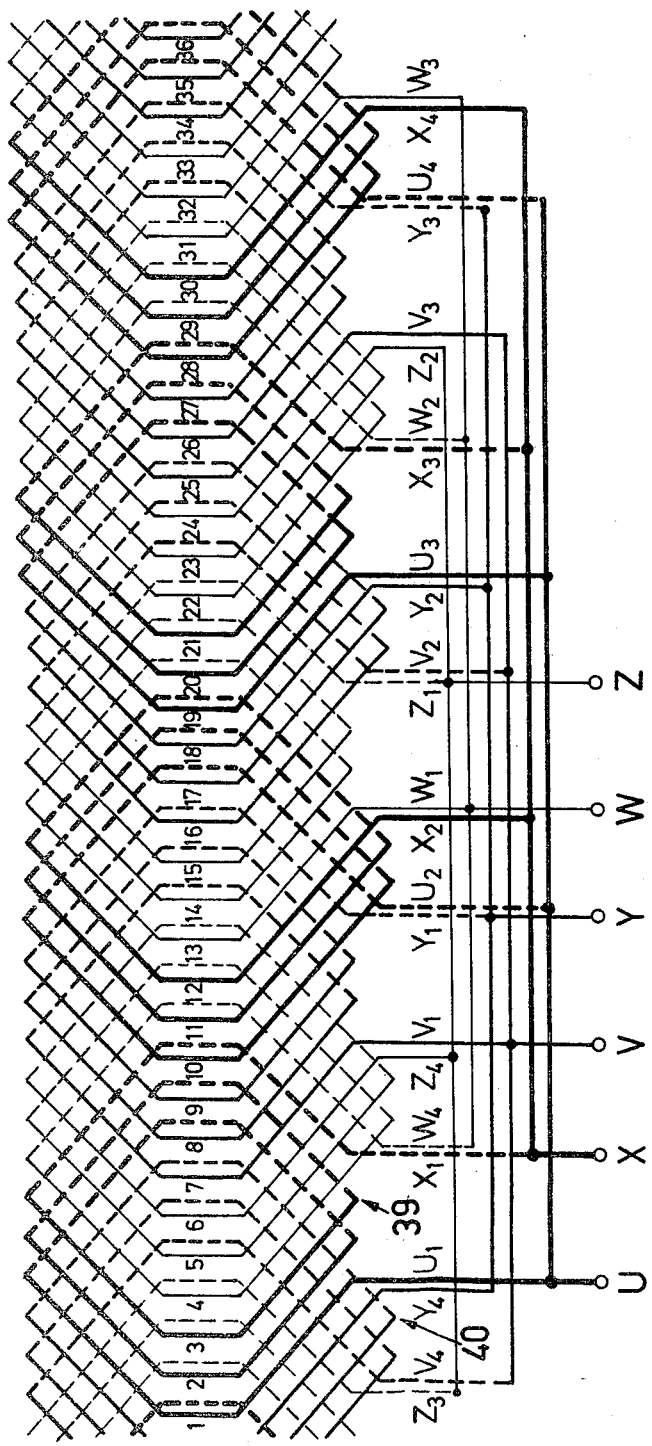
FIG. 10 shows a Δ-connected two-layer chorded three-phase winding in accordance with the invention, with four coil sets per phase, connected in shunt.
FIG. 11 illustrates the spatial arrangement of the coil sets as shown in FIG. 10 in the form of a cross-section through the active component, taken perpendicular to the machine axis.
FIG. 12 depicts the volt-gauge graph for the three-phase winding shown by FIG. 10.

FIGS. 10, 11 and 12 depict a chorded four-pole multiple winding in accordance with the invention with a total of 72 conductor rods which are arranged in the slots 1 to 36 of a stator in two radially superposed layers 37, 38. The three phases UX, VY and WZ are each composed of four sets of coils, namely phase UX with the coil sets $U_1X_1, U_2X_2, U_3X_3$ and $U_4X_4$, phase VY with the coil sets $V_1Y_1, V_2Y_2, V_3Y_3$ and $V_4Y_4$ and phase WZ with coil sets $W_1Z_1, W_2Z_2, W_3Z_3$ and $W_4Z_4$. While conforming with a chording ratio of 7/9, the distribution of the conductor rods at the lower layer 38 is identical with the distribution at the upper layer 37 but is turned inside the active component by an angle of 40° relative to the other layer.

The coil sets $U_1X_1, V_1Y_1, W_1Z_1, U_3X_3, V_3Y_3$ and $W_3Z_3$ are uncrossed and their pitches $y_1 = 7$ and $y_2 = 6$ satisfy the condition $y_1 - y_2 = 1$. However, the coil sets $U_2, X_2, V_2Y_2, W_2Z_2, U_4Z_4, V_4Y_4$ and $W_4Z_4$ are crossed and their pitches $y_1 = 7$ and $y_2 = 8$ satisfy the condition $y_1 - y_2 = -1$. The coil end overhangs 39 of the uncrossed coil sets are shorter than the overhangs 40 of the crossed coil sets. In case of this arrangement, the conductor rods will at the phase changer be again at substantially the same potential, for example the rods 3 and 4, if the coil sets of each phase are connected in shunt as illustrated in the drawing. This fact is demonstrated by the volt-gauge graph of FIG. 12, where $X_1$ and $W_4$ are located at the same point of the delta.

The present invention may be embodied in other specific forms without departing from the spirit or essential characteristics thereof. The presently disclosed exemplary embodiment is therefore to be considered in all respects as illustrative and not restrictive, the scope of the invention being indicated by the appended claims rather than by the foregoing description, and all changes which come within the meaning and range of equivalency of the claims are therefore intended to be embraced.

What is claimed is:

1. A delta connected, two-layer, three-phase multiple winding for electrical machines, especially superconducting machines, with at least two sets of coils per phase connected in shunt, the winding being arranged on the machines such that the coils of one set are cross-connected and the coils of the other set are uncrossed, and the coil end overhangs of the crossed set are longer than the overhangs of the uncrossed set, wherein the voltage difference between conductor rods disposed in the same radial layer of any two adjacent stator slots is at most equal to one winding voltage during operation of the machine.

2. A three-phase winding as defined in claim 1, wherein the winding is a multi-pole winding.

3. A three-phase winding as defined in claim 1, wherein the winding is an unchorded winding.

4. A three-phase winding as defined in claim 1, wherein the winding is a chorded winding.

5. A three-phase winding as defined in claim 4, wherein the chording ratio of the winding is 7/9.

6. A three-phase winding as defined in claim 2, wherein the difference is pitch of the uncrossed coil sets satisfy the condition $y_1 - y_2 = 1$ and the difference in pitch of the crossed coil sets satisfy the condition $y_1 - y_2 = -1$.

7. A three-phase winding as defined in claim 3 wherein the difference in pitch of the uncrossed coil sets satisfy the condition $y_1 - y_2 = 1$ and the difference in pitch of the crossed coil sets safisfy the condition $y_1 - y_2 = -1$.

* * * * *